(12) United States Patent
Hunter et al.

(10) Patent No.: US 9,727,544 B2
(45) Date of Patent: Aug. 8, 2017

(54) ANIMATING EDITS TO DOCUMENTS

(71) Applicant: Dropbox, Inc., San Francisco, CA (US)

(72) Inventors: Rian Hunter, San Francisco, CA (US); Kijun Seo, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 329 days.

(21) Appl. No.: 13/888,328

(22) Filed: May 6, 2013

(65) Prior Publication Data
US 2014/0331126 A1 Nov. 6, 2014

(51) Int. Cl.
*G06F 17/00* (2006.01)
*G06F 17/24* (2006.01)
*G06F 17/22* (2006.01)

(52) U.S. Cl.
CPC .......... *G06F 17/24* (2013.01); *G06F 17/2288* (2013.01)

(58) Field of Classification Search
CPC ..... G06F 17/2288; G06F 17/24; G06F 17/241
See application file for complete search history.

(56) References Cited

U.S. PATENT DOCUMENTS

| | | | |
|---|---|---|---|
| 4,912,637 A * | 3/1990 | Sheedy | G06F 8/71 |
| 5,717,869 A | 2/1998 | Moran et al. | |
| 5,717,879 A | 2/1998 | Moran et al. | |
| 5,786,814 A | 7/1998 | Moran et al. | |
| 5,986,655 A | 11/1999 | Chiu et al. | |
| 6,332,147 B1 | 12/2001 | Moran et al. | |
| 6,918,083 B2 | 7/2005 | Smith | |
| 8,010,894 B2 * | 8/2011 | Merrill | G06F 17/2247 715/229 |
| 8,209,308 B2 | 6/2012 | Rueben et al. | |
| 8,312,081 B2 | 11/2012 | Yuan et al. | |
| 8,566,708 B1 * | 10/2013 | Pereira | G06F 17/21 715/256 |
| 8,595,622 B1 * | 11/2013 | Pereira | G06F 17/21 715/256 |
| 8,856,098 B2 * | 10/2014 | Xie | G06F 17/30696 707/706 |
| 9,529,785 B2 * | 12/2016 | Vagell | G06F 17/241 |
| 2003/0023622 A1 | 1/2003 | Obermeyer et al. | |
| 2004/0093564 A1 | 5/2004 | Kumhyr et al. | |

(Continued)

OTHER PUBLICATIONS

Chevalier, F. et al., "Using Text Animated Transitions to Support Navigation in Document Histories," CHI '10 Proceedings of the SIGCHI Conference on Human Factors in Computing Systems, Apr. 10-15, 2010, pp. 683-692.

*Primary Examiner* — Scott Baderman
*Assistant Examiner* — Matthew G McVicker
(74) *Attorney, Agent, or Firm* — Fenwick & West LLP

(57) ABSTRACT

A notes system is presented with a content management system. The notes system manages creation and distribution of edits to notes to users sharing the notes. The notes are stored as a series of edits at the notes system. When an edit to a note is received, the edit is propagated to users subscribed to a note by a backend server responsible for managing the note. The shared users are notified through application servers associated with each shared user. The notes server includes various indices for searching the notes and allows notes to be searched quickly to organize viewing by a user of notes and identification of relevant material in the notes. The stored edits are used to display edits to a note to a user by replaying the accessed note to the user.

17 Claims, 16 Drawing Sheets

(56) References Cited

U.S. PATENT DOCUMENTS

| | | |
|---|---|---|
| 2004/0193428 A1 | 9/2004 | Fruchter et al. |
| 2005/0138540 A1* | 6/2005 | Baltus et al. .................. 715/511 |
| 2005/0223325 A1* | 10/2005 | Naitou ................ G06F 17/2247 |
| | | 715/255 |
| 2006/0265639 A1* | 11/2006 | Merrill ................ G06F 17/2247 |
| | | 715/210 |
| 2007/0260996 A1 | 11/2007 | Jakobson |
| 2008/0109717 A1* | 5/2008 | Krauter .................. G06F 17/24 |
| | | 715/255 |
| 2009/0089665 A1* | 4/2009 | White .................. G06F 3/0237 |
| | | 715/257 |
| 2009/0226098 A1* | 9/2009 | Takahashi ......... G06F 17/30985 |
| | | 382/218 |
| 2011/0016111 A1* | 1/2011 | Xie .................. G06F 17/30696 |
| | | 707/723 |
| 2011/0055702 A1* | 3/2011 | Jakobson ...................... 715/723 |
| 2012/0047434 A1* | 2/2012 | Ginetti ........................ 715/255 |
| 2012/0272151 A1* | 10/2012 | Grossman ............ G06F 17/2288 |
| | | 715/719 |
| 2013/0021344 A1 | 1/2013 | Wang et al. |
| 2013/0031449 A1 | 1/2013 | Griffiths et al. |
| 2013/0047066 A1 | 2/2013 | Lee |
| 2013/0159853 A1* | 6/2013 | Story, Jr. ................. G06F 3/165 |
| | | 715/716 |
| 2013/0191740 A1* | 7/2013 | Bell ........................ H04L 67/22 |
| | | 715/273 |
| 2013/0326323 A1* | 12/2013 | Siwoff et al. ................. 715/229 |
| 2014/0149857 A1* | 5/2014 | Vagell .................. G06F 17/241 |
| | | 715/255 |

* cited by examiner

ANIMATING EDITS TO DOCUMENTS

TECHNICAL FIELD

The disclosed embodiments relate generally to sharing media files over a network. In particular, the disclosed embodiments are directed to sharing notes between groups of users.

BACKGROUND

Collaborative sharing of documents is typically provided by a network-based file sharing computer system that allows multiple users to access and edit the files. File sharing systems typically use complex, hierarchical file directories to provide users with a way to identify content by a filename or a path in a file directory, which makes identifying a desired document time-consuming, particularly if the desired information is within the body of a document. File sharing systems sometimes rely on the native file system retrieval mechanisms provided by the operating system; this results in limitations on the ability to conduct searches for documents based on their content, edits, shared status, or other aspects not supported at the operating system level.

SUMMARY

A notes sharing system provides an animated display of edits to a document. A client application accesses a notes sharing system to retrieve the document and a set of edits associated with the document. The edits indicate modifications to the document, such as insertions of text, deletion of text, and formatting changes; each edit has an associated edit time at which the edit was made to the document. The client application filters the edits to determine an ordered set of edits to display to the user. The filtering may be based on the number of edits, the type of edits, the amount of time required to display the edits, and other factors. The edits are ordered in the set according to their associated edit times.

After determining a set of edits to display to the user, the client application determines a state of the document prior to application of the set of edits. The set of edits to display may also be grouped to show similar types of edits at the same time or to determine sequential edits of the same type. The state of the document is displayed to the user, and the edits are applied to the document by the client application. In applying the edits, the client application sequentially displays the edits on a character-by-character, word-by-word (or by another granularity) basis according to the order of the edits in the sets. The sequential, granular animated presentation of edits to a document is called "replaying" the edits. In this way, edits to a document are animated when the user views the document and enables the user to view the edits more dynamically relative to a static versioning system.

The figures depict various embodiments of the present invention for purposes of illustration only. One skilled in the art will readily recognize from the following description that other alternative embodiments of the structures and methods illustrated herein may be employed without departing from the principles of the invention described herein.

DETAILED DESCRIPTION

Figure 1:
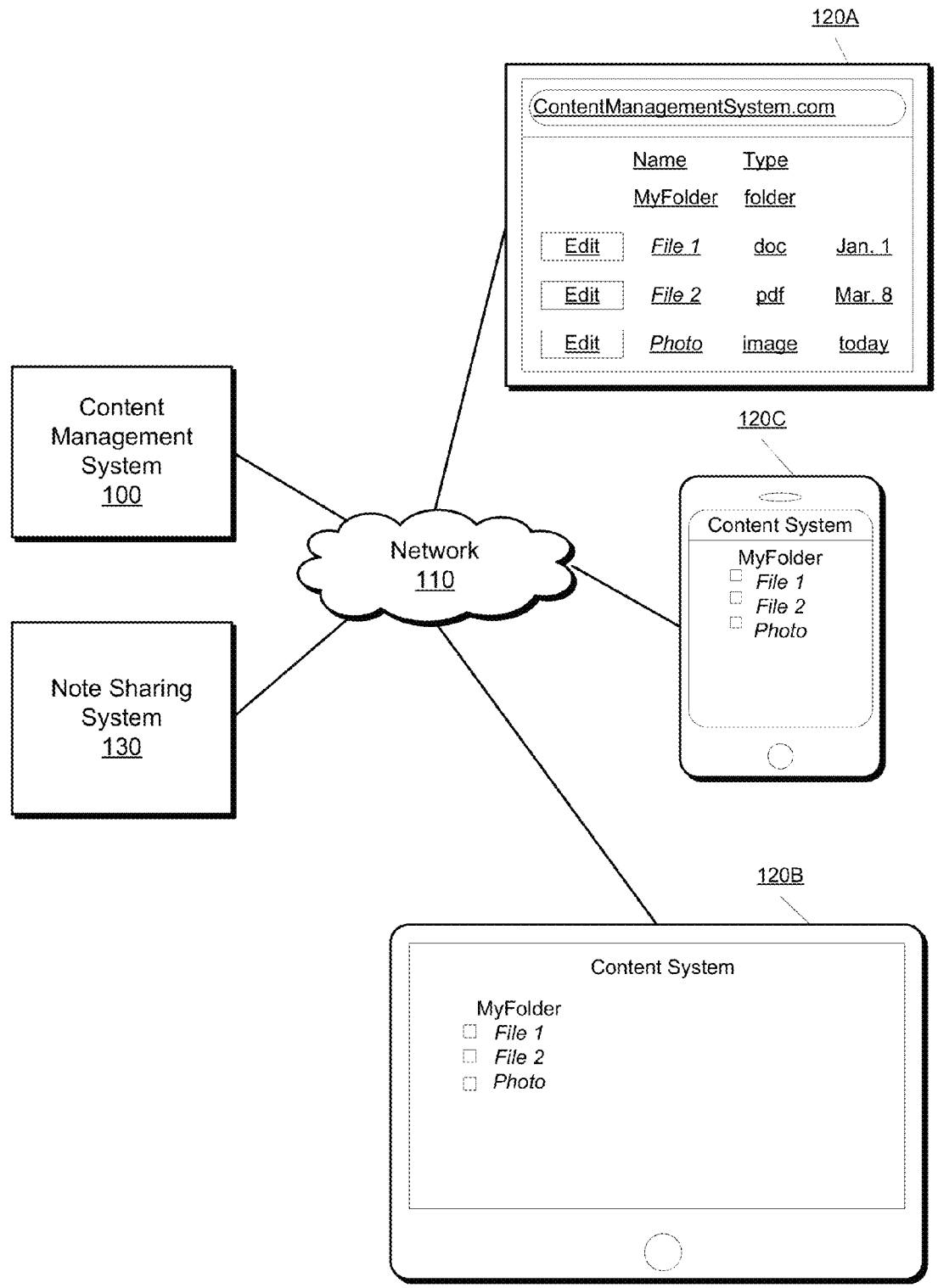
FIG. 1 shows a diagram of a system environment of a content management system and a note sharing system, according to one embodiment.

FIG. 1 shows a system environment including content management system 100, note sharing system 130, and client devices 120A, 120B, 120C (collectively or individually "120"). Content management system 100 provides content sharing and synchronization services for users of client devices 120. These services allow users to share content with other users of client devices 120. In addition to content sharing, content management system 100 updates shared content responsive to changes and enables users to synchronize changes across multiple client devices 120. A user may synchronize content across multiple client devices 120 owned by the user and associated with the user's account, and the user may share content that is synchronized with devices associated with other users' accounts. The content stored by content management system 100 can include any type of data, such as digital data, documents, media (e.g., images, photos, videos, audio, streaming content), data files and databases, source and object code, recordings, and any other type of data or file. The content stored by content management system 100 may be organized in one configuration in folders, tables, or in other database structures (e.g., object oriented, key/value etc.).

In the environment illustrated in FIG. 1, each of client devices 120 accesses shared content through content management system 100. Thus, each client device 120 may jointly access various types of content, such as a folder MyFolder containing files such as file 1, file 2, and photo. Various types of devices can function as a client device, such as desktop computer 120A, tablet computer 120B, and mobile device 120C. Any device capable of accessing content management system 100 and interacting with the content items stored on content management system 100 may be used as a client device 120.

Users may create accounts at content management system 100 and store content thereon by transmitting such content from client device 120 to content management system 100. The content provided by users is associated with user accounts that may have various privileges. The privileges may include viewing the content item, modifying the content item, modifying user privileges related to the content item, and deleting the content item.

Note sharing system 130 provides users of client devices 120 with the ability to create, store, access, and share notes. Notes are documents that a user can create using a notes editor. In one embodiment, the content shared by content management system 100 includes content created by using third party applications, e.g., word processors, video and image editors, database management systems, spreadsheet applications, code editors, and so forth, which are independent of content management system 100. For note sharing system 130, note editor 282 can be provided on client device 120, or can be hosted by note sharing system 130 itself, as further described below.

Client devices 120 communicate with content management system 100 and note sharing system 130 through network 110. The network may be any suitable communications network for data transmission. In one embodiment, network 110 is the Internet and uses standard communications technologies and/or protocols. Thus, network 110 can include links using technologies such as Ethernet, 802.11, worldwide interoperability for microwave access (Wi-MAX), 3G, digital subscriber line (DSL), asynchronous transfer mode (ATM), InfiniBand, PCI Express Advanced Switching, etc. Similarly, the networking protocols used on network 110 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over network 110 can be represented using technologies and/or formats including the hypertext markup language (HTML), the extensible markup language (XML), etc. In addition, all or some of links can be encrypted using conventional encryption technologies such as the secure sockets layer (SSL), transport layer security (TLS), virtual private networks (VPNs), Internet Protocol security (IPsec), etc. In another embodiment, the entities use custom and/or dedicated data communications technologies instead of, or in addition to, the ones described above.

Figure 2:
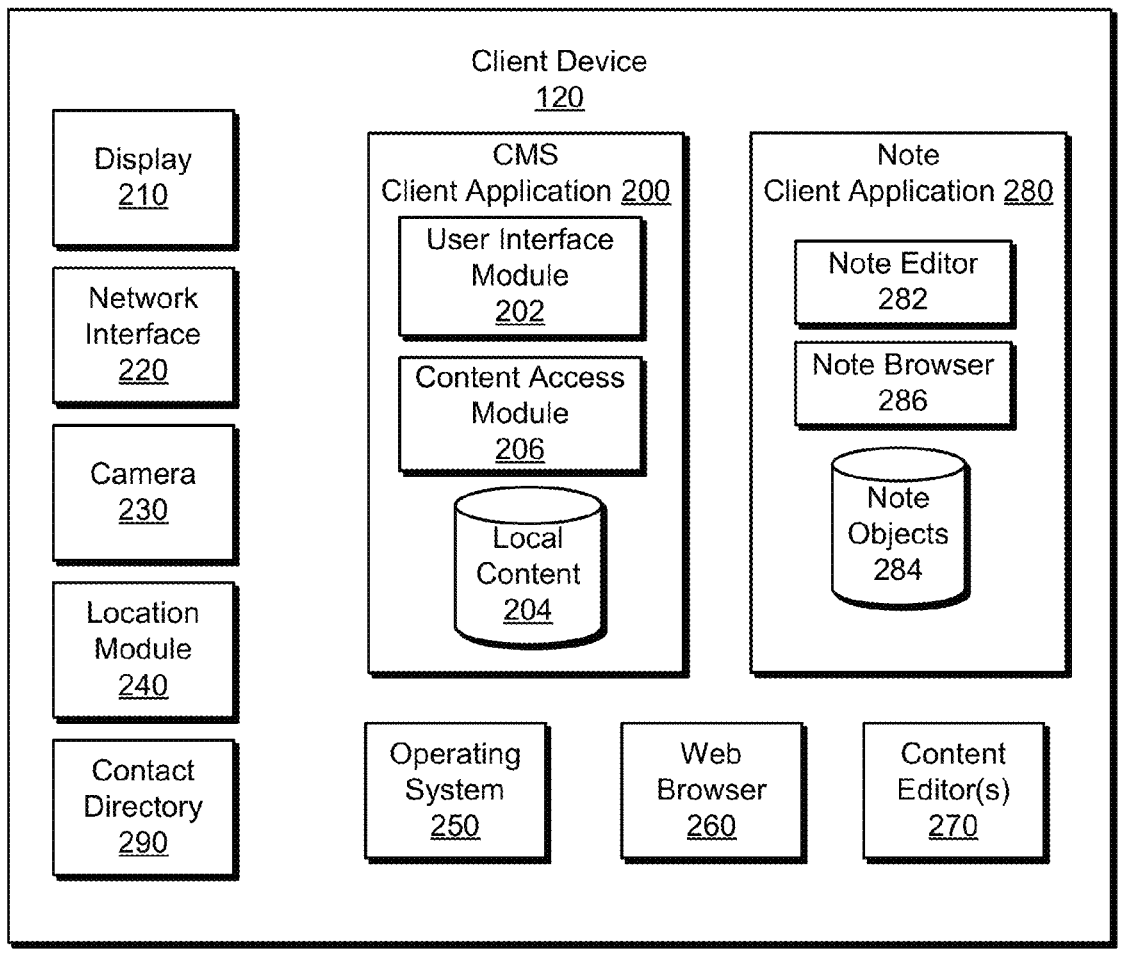
FIG. 2 shows a block diagram of the components of a client application of the online content management system and the note sharing system.

FIG. 2 shows one embodiment of components of client device 120. Client device 120 generally includes devices and modules for communicating with content management system 100 and a user of client device 120. Client device 120 includes display 210 for providing information to the user, and in certain client devices 120 includes a touchscreen. Client device 120 also includes network interface 220 for communicating with content management system 100 via network 110. Other conventional components of a client device 120 that are not material are not shown, for example, one or more computer processors, local fixed memory (RAM and ROM), as well as optionally removable memory (e.g., SD-card), power sources, and audio-video outputs.

Client devices 120 maintain various types of components and modules for operating the client device and accessing content management system 100. The software modules include operating system 250 and one or more content editors 270. Content editors 270 vary based on the client device, and may include various applications for creating, viewing, and modifying content stored on content management system 100, such as word processors, spreadsheets, database management systems, code editors, image and video editors, and the like. Operating system 250 on each device provides a local file management system and executes the various software modules such as content management system client application 200 and content editor 270. A contact directory 290 stores information on the user's contacts, such as name, telephone numbers, company, email addresses, physical address, website URLs, and the like.

Client devices 120 access content management system 100 in a variety of ways. Client device 120 may access content management system 100 through a native application or software module, such as content management system client application 200. A schematic example display from a client application is shown in FIG. 1 on client devices 120B and 120C. Client device 120 may also access content management system 100 through web browser 260 as shown on client device 120A. As an alternative, the client application 200 may integrate access to content management system 100 with the local file management system provided by operating system 250. When access to content management system 100 is integrated in the local file management system, a file organization scheme maintained at content management system is represented as a local file structure by operating system 250 in conjunction with client application 200.

Client application 200 manages access to content management system 100. Client application 200 includes user interface module 202 that generates an interface to the content accessed by client application 200, as variously illustrated herein, and is one means for performing this function. The generated interface is provided to the user by display 210. Client application 200 may store content accessed from a content storage at content management system 100 in local content 204. While represented here as within client application 200, local content 204 may be stored with other data for client device 120 in non-volatile storage. When local content 204 is stored this way, the content is available to the user and other applications or modules, such as content editor 270, when client application 200 is not in communication with content management system 100. Content access module 206 manages updates to local content 204 and communicates with content management system 100 to synchronize content modified by client device 120 with content maintained on content management system 100, and is one means for performing this function. Client application 200 may take various forms, such as a stand-alone application, an application plug-in, or a browser extension.

In certain embodiments, client device 120 includes additional components such as camera 230 and location module 240. Location module 240 determines the location of client device 120, using for example a global positioning satellite signal, cellular tower triangulation, or other methods. Location module 240 may be used by client application 200 to obtain location data and add the location data to metadata about a content item.

Figure 3:
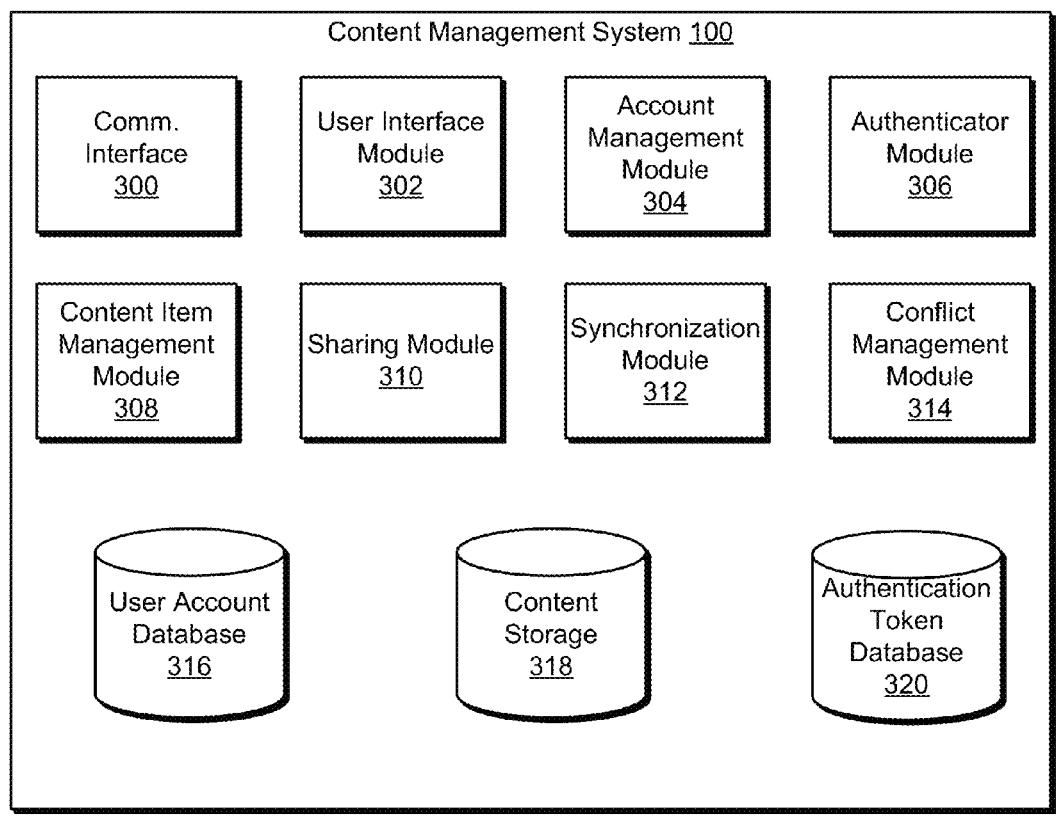
FIG. 3 shows a block diagram of the content management system.

FIG. 3 shows components of content management system 100 according to one embodiment. To facilitate the various content management services, a user can create an account with content management system 100. The account information can be maintained in user account database 316, and is one means for performing this function. User account database 316 can store profile information for registered users. In some cases, the only personal information in the user profile can be a username and/or email address. However, content management system 100 can also be configured to accept additional user information, such as password recovery information, demographics information, payment information, and other details. Each user is associated with an identifier, such as a userID or a user name. For purposes of convenience, references herein to information such as notes or other data being associated with a user are understood to mean an association with the user identifier for the user. Similarly, data processing operations on notes and users are understood to be operations performed on corresponding identifiers such as noteID and userIDs.

User account database 316 can also include account management information, such as account type, e.g. free or paid; usage information for each user, e.g., file edit history; maximum storage space authorized; storage space used; content storage locations; security settings; personal configuration settings; content sharing data; etc. Account management module 304 can be configured to update and/or obtain user account details in user account database 316. Account management module 304 can be configured to interact with any number of other modules in content management system 100.

An account can be used to store content, such as documents, text files, audio files, video files, etc., from one or more client devices associated with the account. The content can also include folders of various types with different behaviors, or other content item grouping methods. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 318, which is one means for performing this function. Content storage 318 can be a storage device, multiple storage devices, or a server. Alternatively, content storage 318 can be a cloud storage provider or network storage accessible via one or more communications networks. In one configuration, content management system 100 stores the content items in the same organizational structure as they appear on the client device. However, content management system 100 can store the content items in its own order, arrangement, or hierarchy.

Content storage 318 can also store metadata describing content items, content item types, and the relationship of content items to various accounts, folders, or groups. The metadata for a content item can be stored as part of the content item or can be stored separately. In one configuration, each content item stored in content storage 318 can be assigned a system-wide unique identifier.

Content storage 318 can decrease the amount of storage space required by identifying duplicate files or duplicate segments of files. Instead of storing multiple copies of an identical content item, content storage 318 stores a single copy and then uses a pointer or other mechanism to link the duplicates to the single copy. Similarly, content storage 318 stores files using a file version control mechanism that tracks changes to files, different versions of files (such as a diverging version tree), and a change history. The change history includes a set of changes that, when applied to the original file version, produces the changed file version.

Content management system 100 automatically synchronizes content from one or more client devices, using synchronization module 312, which is one means for performing this function. The synchronization is platform agnostic. That is, the content is synchronized across multiple client devices 120 of varying type, capabilities, operating systems, etc. For example, client application 200 synchronizes, via synchronization module 312 at content management system 100, content in client device 120's file system with the content in an associated user account on system 100. Client application 200 synchronizes any changes to content in a designated folder and its sub-folders with the synchronization module 312. Such changes include new, deleted, modified, copied, or moved files or folders. Synchronization module 312 also provides any changes to content associated with client device 120 to client application 200. This synchronizes the local content at client device 120 with the content items at content management system 100.

Conflict management module 314 determines whether there are any discrepancies between versions of a content item located at different client devices 120. For example, when a content item is modified at one client device and a second client device, differing versions of the content item may exist at each client device. Synchronization module 312 determines such versioning conflicts, for example by identifying the modification time of the content item modifications. Conflict management module 314 resolves the conflict between versions by any suitable means, such as by merging the versions, or by notifying the client device of the later-submitted version.

A user can also view or manipulate content via a web interface generated by user interface module 302. For example, the user can navigate in web browser 260 to a web address provided by content management system 100. Changes or updates to content in content storage 318 made through the web interface, such as uploading a new version of a file, are synchronized back to other client devices 120 associated with the user's account. Multiple client devices 120 may be associated with a single account and files in the account are synchronized between each of the multiple client devices 120.

Content management system 100 includes communications interface 300 for interfacing with various client devices 120, and with other content and/or service providers via an Application Programming Interface (API), which is one means for performing this function. Certain software applications access content storage 318 via an API on behalf of a user. For example, a software package, such as an app on a smartphone or tablet computing device, can programmatically make calls directly to content management system 100, when a user provides credentials, to read, write, create, delete, share, or otherwise manipulate content. Similarly, the API can allow users to access all or part of content storage 318 through a web site.

Content management system 100 can also include authenticator module 306, which verifies user credentials, security tokens, API calls, specific client devices, etc., to determine whether access to requested content items is authorized, and is one means for performing this function. Authenticator module 306 can generate one-time use authentication tokens for a user account. Authenticator module 306 assigns an expiration period or date to each authentication token. In addition to sending the authentication tokens to requesting client devices, authenticator module 306 can store generated authentication tokens in authentication token database 320. Upon receiving a request to validate an authentication token, authenticator module 306 checks authentication token database 320 for a matching authentication token assigned to the user. Once the authenticator module 306 identifies a matching authentication token, authenticator module 306 determines if the matching authentication token is still valid. For example, authenticator module 306 verifies that the authentication token has not expired or was not marked as used or invalid. After validating an authentication token, authenticator module 306 may invalidate the matching authentication token, such as a single-use token. For example, authenticator module 306 can mark the matching authentication token as used or invalid, or delete the matching authentication token from authentication token database 320.

Content management system 100 includes a sharing module 310 for sharing content publicly or privately, which is one means for performing this function. Sharing content publicly can include making the content item accessible from any computing device in network communication with content management system 100. Sharing content privately can include linking a content item in content storage 318 with two or more user accounts so that each user account has access to the content item. The content can also be shared across varying types of user accounts.

In some embodiments, content management system 100 includes a content management module 308 for maintaining a content directory that identifies the location of each content item in content storage 318, and allows client applications to request access to content items in the storage 318, and which is one means for performing this function. A content entry in the content directory can also include a content pointer that identifies the location of the content item in content storage 318. For example, the content entry can include a content pointer designating the storage address of the content item in memory. In some embodiments, the content entry includes multiple content pointers that point to multiple locations, each of which contains a portion of the content item.

In addition to a content path and content pointer, a content entry in some configurations also includes user account identifier that identifies the user account that has access to the content item. In some embodiments, multiple user account identifiers can be associated with a single content entry indicating that the content item has shared access by the multiple user accounts.

To share a content item privately, sharing module 310 adds a user account identifier to the content entry associated with the content item, thus granting the added user account access to the content item. Sharing module 310 can also be configured to remove user account identifiers from a content entry to restrict a user account's access to the content item.

To share content publicly, sharing module 310 generates a custom network address, such as a URL, which allows any web browser to access the content in content management system 100 without any authentication. The sharing module 310 includes content identification data in the generated URL, which can later be used by content management system 100 to properly identify and return the requested content item. For example, sharing module 310 can be configured to include the user account identifier and the content path in the generated URL. The content identification data included in the URL can be transmitted to content management system 100 by a client device to access the content item. In addition to generating the URL, sharing module 310 can also be configured to record that a URL to the content item has been created. In some embodiments, the content entry associated with a content item can include a URL flag indicating whether a URL to the content item has been created.

Figure 4:
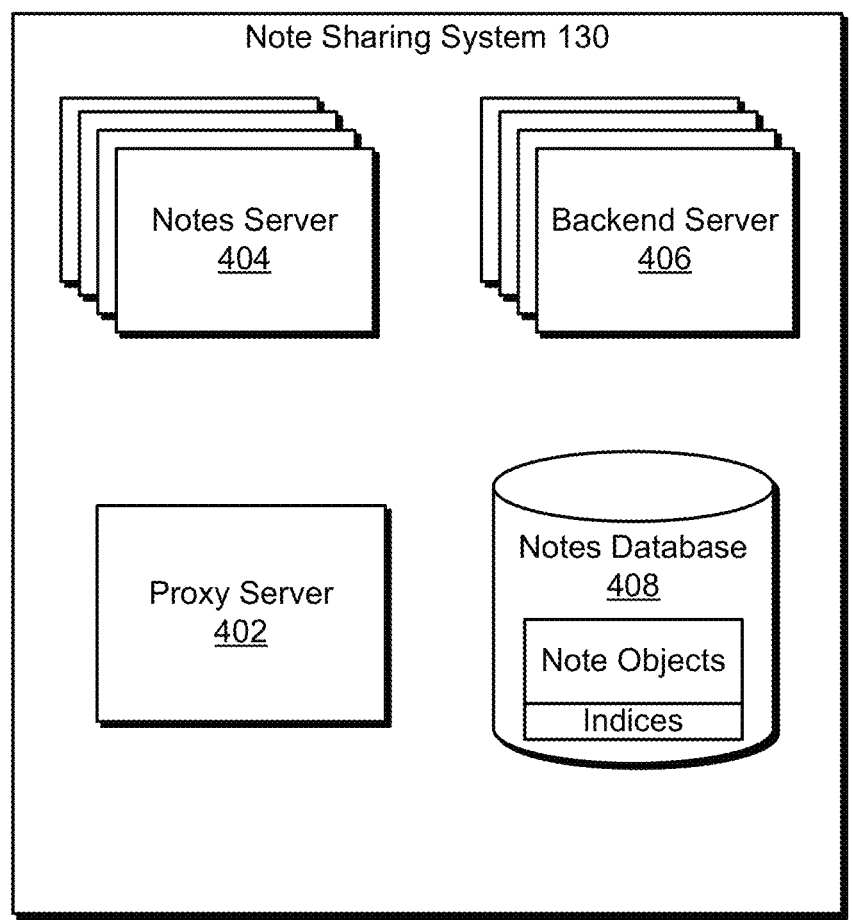
FIG. 4 shows a block diagram of the note sharing system.

FIG. 4 shows a block diagram of note sharing system 130 that provides content sharing for notes content in a content management system. Like other content items, notes may be shared and synchronized with multiple users and client devices 120, using sharing 310 and synchronization 312 modules of content management system 100. Users operate client devices 120 to create and edit notes, and to share notes with other users of client devices 120. Changes to a note by one client device 120 are propagated to other client devices 120 of users associated with that note. For purposes of convenience, user notes associated with a user include (i) notes that the current user created but has not shared, and (ii) shared notes, which include (1) notes which have been created by the user and shared with other users, and (2) notes created by other users and shared with the current user.

In the embodiment of FIG. 1, note sharing system 130 is shown as separate from content management system 100, and can communicate with it to obtain its services. In other embodiments, note sharing system 130 is a subsystem of the component of content management system 100 that provides sharing and collaboration services for various types of content items. User account database 316 and authentication token database 320 from content management system 100 are used for accessing note sharing system 130 described herein.

Note sharing system 130 includes various servers for managing access and edits to notes. Note sharing system includes proxy server 402, notes servers 404, and backend server 406. Proxy server 402 is responsible for handling requests from client applications 280 and passing those requests to the notes servers 404. Notes servers 404 manage application level requests for client applications 280 and selectively interact with backend servers 404 for processing lower level processing tasks on notes, and interfacing with notes database 408 as needed. Notes database 408 stores the notes, and provides programmatic access thereto for searching and retrieving notes, and is one means for performing these functions. Each note is represented in notes database 408 as a note object. Each note object is represented by a noteID, the text of the note, a list of edits performed on the note, and various types of metadata, such as the sharing users associated with the note and a creation timestamp indicating the creation time of the note.

The edit list includes the list of edits performed on the note, such as insertions, deletions, font changes (e.g., selection of font, as well as bold, italic, underling, etc.), and other changes to a note. Each edit identifies the user performing the edit, a timestamp of the edit, and the content of the edit. An "insert" edit designates the insertion position within the note (e.g., character offset from beginning of note) and the content to be inserted at the position of the insert edit. A "delete" edit designates the position from which to delete content and the number of characters to be deleted. A "modify" edit indicates the beginning position from which to modify an attribute of the text in a note, an ending position from which to stop the modification, and a modification attribute (e.g., bold, underline, and italicize). Edits may also indicate modifications to the metadata for a note, such as the addition or deletion of sharing users.

Notes database 408 also includes a set of indices. These indices are logical in nature, and may be implemented in various ways, depending on the underlying database design. A user index contains a list of all users by their userID, and for each userID there is a list of noteIDs. Each noteID identifies a note to which the user of the userID is subscribed. For each noteID there is a status indicator that indicates whether the note is active or inactive for the user. A note is active for the user sharing the note until the user deletes the note. In one embodiment, when the user deletes the note, the note persists in the note database 408 remains associated with the user but status indicator is set to inactive, allowing the user to reactivate their sharing status with the note in the future. The note remains active for and associated with any other shared users. Alternatively, the note may be deleted from the note database 408, so that none of the shared users have access to it anymore. The user index is used to identify notes associated with (shared with) a given user and the status of those notes with respect to the user.

Notes database 408 can include a note index. The note index indicates, for each note, a list of userIDs of users subscribed to the note, and an indication of whether the user is active or inactive. This index can be an inverse of the user index and may be stored together with the user index.

Notes database 408 can also include a term index identifying the presence of terms (i.e., keywords or other tokens) in each note. For each term, a list of noteIDs is included in the term index indicating notes that contain the term. The term may be represented in the term index by the term itself, or the term may be hashed to determine a term hash value, or may be given a term identifier. Certain terms may also be excluded from inclusion in the term index, such as common stop words and other terms that are not suitable for searching (e.g., "a" "an" "the" and the like). For a given note, additional information may be stored indicating the frequency of the term in the note (raw or weighted), as well as position(s) in the note where the term appears. Notes database 408 exposes a search function to notes servers 404. The search function takes as input the userID of the user making the search request, and zero or more terms to be searched. The search function uses the user index to identify a list of all notes to which the user is a sharing user and the status is active. For each of the query terms, the search function obtains the list of notes containing the term from the term index, and then unions these lists to obtain a unified list of notes containing the query terms. This unified list of notes is intersected with the list of shared notes for the user, thereby identifying all shared notes of the user that include one or more of the query terms. The search function may then sort (rank) notes using an information retrieval ranking function, for example ranking each note by the number and frequency of query terms. Alternatively, the search function can sort notes based on their creation timestamps and edit timestamps, ordering notes in reverse chronological order from most recent edit/creation to least recent. The search function then uses the noteIDs for the identified notes to retrieve notes. The retrieved notes are then transmitted to the requesting client device.

Notes database 408 may include additional indices associated with notes. For example a location index may include a list of locations (e.g., city names and places) and for each location, a list of noteIDs for notes that were created at the location or edited at the location. Alternatively, the creation and/or edit locations for each note may be stored with the note as metadata, for example as part of the edit list data.

Content management system 100 and note sharing system 130 may be implemented using a single computer, or a network of computers, including cloud-based computer implementations. For the purposes of this disclosure, a computer is device having one or more processors, memory, storage devices, and networking resources. The computers are preferably server class computers including one or more high-performance CPUs and 1 G or more of main memory, as well as 500 Gb to 2 Tb of computer readable, persistent storage, and running an operating system such as LINUX or variants thereof. The operations of content management system 100 and note sharing system 130 as described herein can be controlled through either hardware or through computer programs installed in computer storage and executed by the processors of such server to perform the functions described herein. These systems include other hardware elements necessary for the operations described here, including network interfaces and protocols, input devices for data entry, and output devices for display, printing, or other presentations of data, but which are not described herein. Similarly, conventional elements, such as firewalls, load balancers, notes servers, failover servers, network management tools and so forth are not shown so as not to obscure the features of the system. Finally, the functions and operations of content management system 100 and note sharing system 130 are sufficiently complex as to require implementation on a computer system, and cannot be performed in the human mind simply by mental steps.

Referring again to FIG. 2, client device 120 further includes a note sharing system client application 280. Note sharing system client application 280 includes note editor 282 that enables the user to create, edit and delete notes, store notes to note sharing system 130, note browser 286 that accesses notes from note sharing system 130 through browsing and searching, and share notes with other users. Note objects database 284 provides local storage of notes on client device 120.

Figure 5:
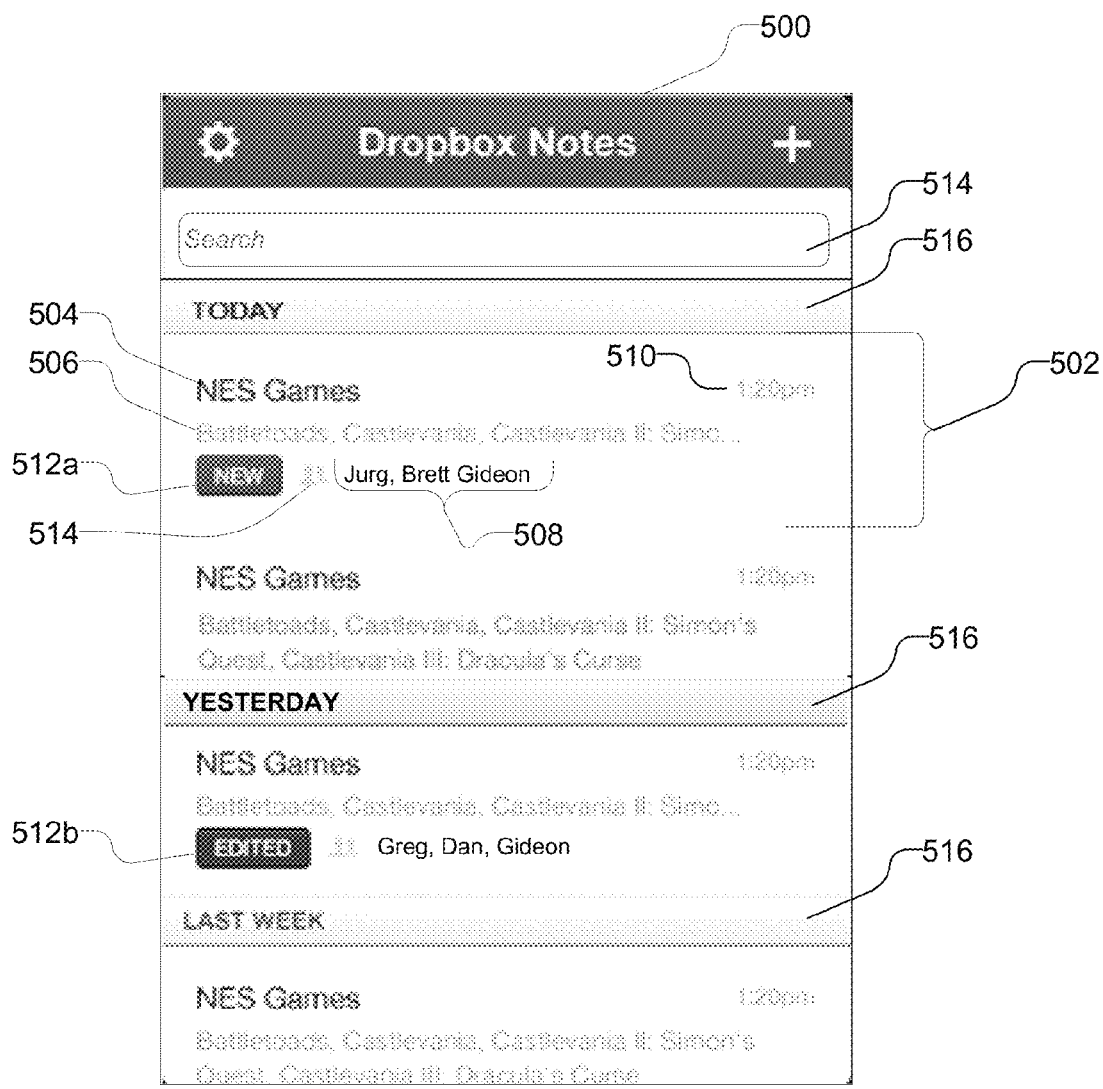
FIG. 5 is an illustration of a home screen of the client application, showing a note list view.

Referring now to FIG. 5, there is shown home screen 500 of notes client application 280. The note browser 286 generates home screen 500 (or home page) which presents a list view of notes to the user upon starting up client application 280, or whenever the user returns to home screen 500 following other operations, e.g., searching or editing notes. The user can scroll through the available notes 502 and select notes for further operations. Each note 502 is shown with title 504, text snippet 506, sharing user 508, time 510, and status icon 512. These features are described as follows:

Title 504: The title is provided by the user when creating the note.

Text snippet 506: a portion of the text of note 502 provided to show recent content changes to note 502. The snippet can be set to any of the following: 1) the most recently inserted text, 2) the most recently modified text. This setting can be made by the system administrator, or by the user via a setting in client application 280. Client application 280 determines the text for the snippet based on the most recent edit (or series of edits) for note 502. The length of snippet can be set by the user. If set to 0, nothing is shown. A maximum length can be established (e.g., 20 characters).

Sharing users 508: a list of the user names of the sharing users for the note. Sharing user icon 514 may also be presented to indicate that note 502 is shared. In one embodiment, the list of user names is ordered based on the order in which they last edited note 502, with the user name of the user who provided the most recent edits to the note shown first (i.e., based on reverse chronological order of edits). For example in FIG. 5, there are three sharing users 508 associated with the first note 502, listed in the order "Jurg, Brett, Gideon". This ordering indicates that Jurg made the most recent edit to the note, and Gideon made the least recent edit. Alternatively, the user names of the sharing users are listed in alphabetical order, and the user name of the last sharing user to edit note 502 shown in bold, italics, highlights or other visually distinguished manner. If note 502 is not shared, then no user names are listed. The name of the current user is not shown. The client application 280 may include a user interface configured to receive a selection of a setting for listing the shared users names by order of most recent edit or alphabetically.

Status icon 512: An icon 512 placed in the context of note 502 to indicate its status. The New status icon 512*a* is shown after a note 502 is created and remains until the first time note 502 is edited. The Edited status icon 512*b* is shown after a note 502 is edited by a user. The status icon remains until the current user views the contents of the edited note. Once the edited note is viewed, the status icon is removed.

Note browser 286 can group and sort notes 502 in various arrangements, as selected by the user. One arrangement is by date, in reverse chronological order by time of last edit or creation date, with the following date range groups: Today, Yesterday, This week, Last Week, Older. FIG. 5 shows data range groups 516 including Today, Yesterday, and Last Week. This arrangement is beneficial as it allows the current user to see the most recently edited notes, along with information identifying which of the shared users edited the notes, as explained above.

Figure 6A:
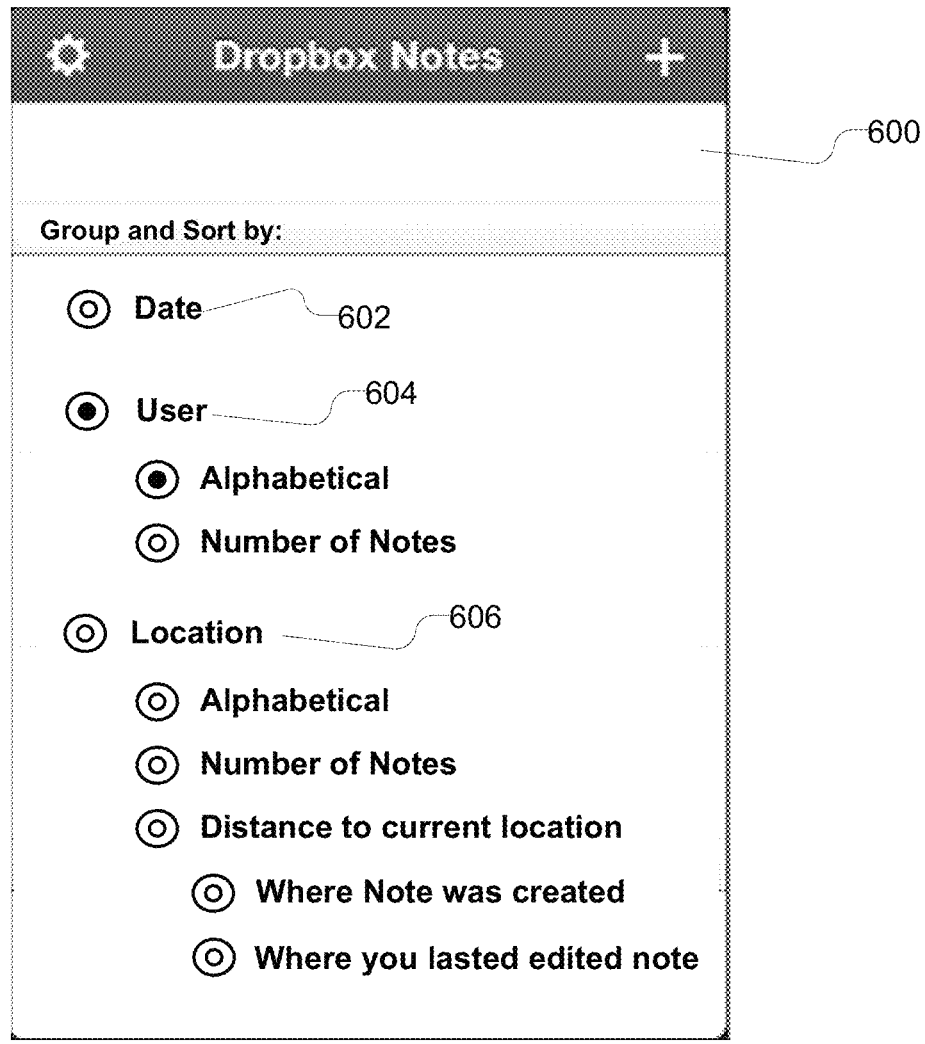
FIG. 6A is an illustration of a setting screen for setting grouping and sorting arrangements for the note list view.
Figure 6B:
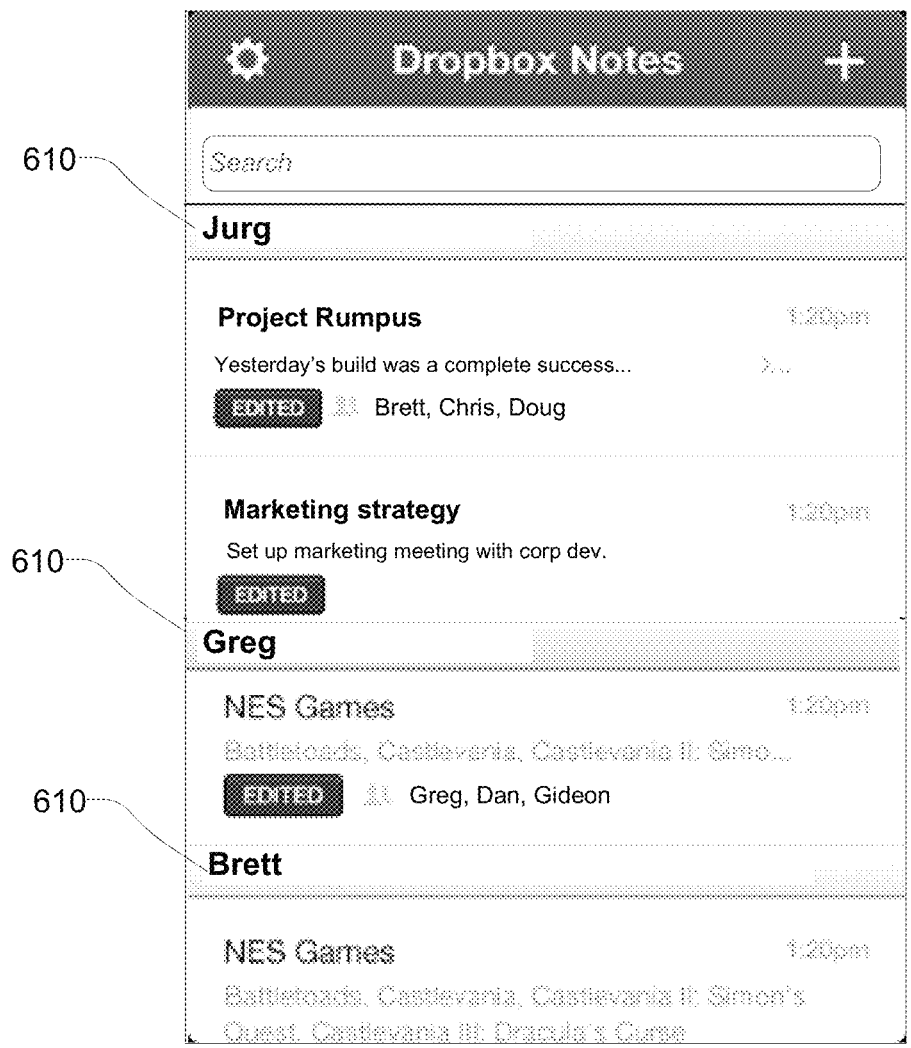
FIG. 6B is an illustration of the home screen with notes grouped by user name.
Figure 6C:
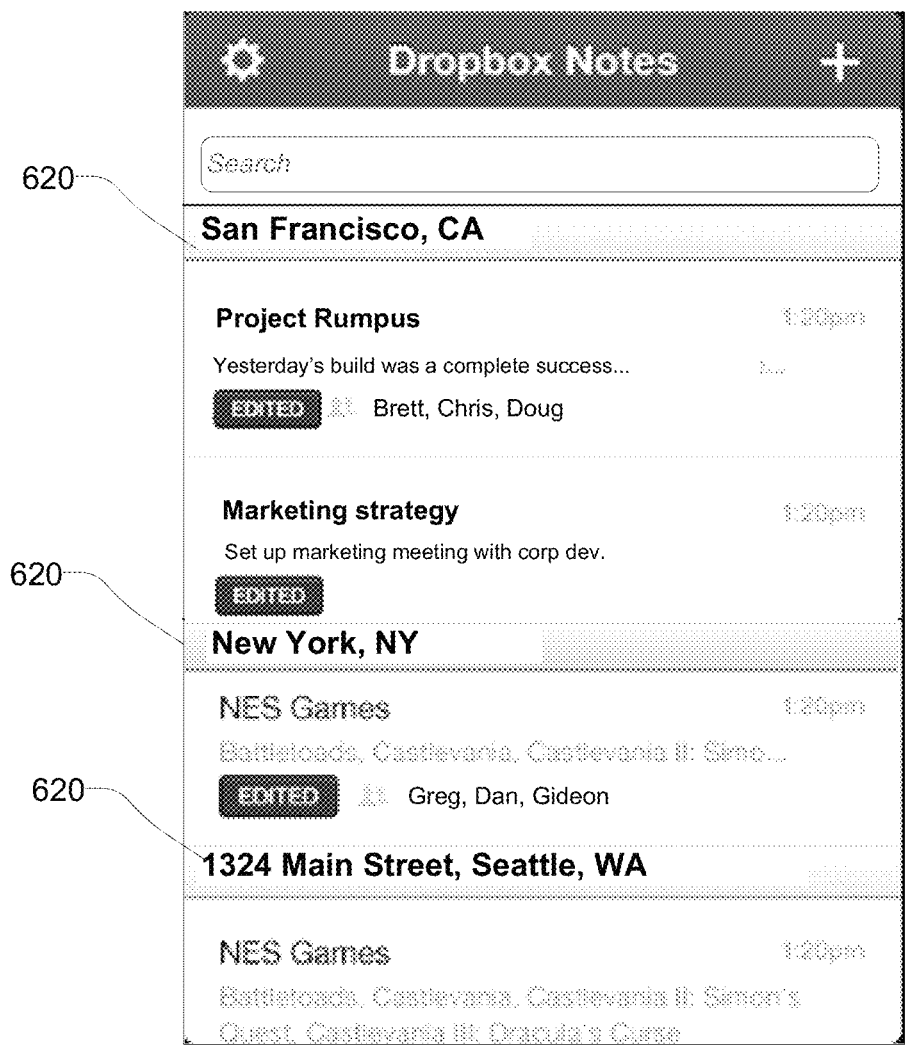
FIG. 6C is an illustration of the home screen with notes grouped by location name.

Other groupings may be provided by the note browser 286, as selected by the user as shown in FIGS. 6B and 6C, using a settings dialog 600 as shown in FIG. 6A, as follows:

Group by Sharing user (FIG. 6A 604): FIG. 6B illustrates this arrangement, in which note browser 286 groups notes together based on the name of a sharing user. For each sharing user in the set of notes, a "user group" 610 of notes is formed that contains all of notes that are shared with that user. For example, in FIG. 6B there are user groups for users Jurg, Greg, and Brett. The user groups 610 can be sorted alphabetically by user name, or sorted in descending (or ascending) order based on the number of notes in each user group 610. When sorted in descending order based on number of notes in each user group 610 (as illustrated in FIG. 6B), the user with the most notes shared with the current user appears at the top of the list as the first grouping. This is beneficial because it enables the user to identify which other user they share the most notes with. The sharing users 508 list is also displayed so that the current user can see which shared user has most recently edited the note.

Group by Location (FIG. 6A 606): FIG. 6C illustrates this arrangement, in which the note browser 286 groups notes together according to their location. Each location group 620 has a location name (e.g., a city name, place name). FIG. 6C illustrates location groups 620 for San Francisco, New York, and 1324 Main Street, Seattle. The location groups are then sorted alphabetically by location name, or as shown in FIG. 6C, by number of notes associated with each location. Location groups 620 can be sorted by the number of notes 502 associated with each location in either descending or ascending order. When sorted in descending order, the location group 620 associated with the most notes appears at the top of the list. For example, in FIG. 6C, location group "San Francisco" has two notes associated with it, and the location groups for New York and 1324 Main Street, Seattle have one note each. This is beneficial because it enables the user to identify the locations for which there are many notes. The sharing users 508 list is also displayed so that the current user can see which shared user has most recently edited the note.

Because some users remember where they created a note (or where they last edited the note), rather than with whom they shared notes, sorting alphabetically enables the user to find notes quickly based on location name. The location of notes 502 may be set as the location of client device 120 at the time the note was created, or the location at the time the note was edited. The location of client device 120 is obtained from location module 240. The location information for each note may be maintained by notes database 408. In this embodiment, client application 280 provides the location along with the note to note sharing system 120 when the user creates or edits a note. Alternatively, in one embodiment, location information for notes created or edited by the user may be stored locally on the client device, for example in a location index, that lists for each location, the noteIDs of notes created or edited at the location. In this embodiment, it is assumed that a user is only interested in the locations at which she edited the note, since she would not typically know the locations at which any of the sharing users edited the note.

Note browser 286 can also arrange the location groups 620 by distance (proximity) to the current location of client device 120 (making use of the location module 240 to obtain the current location of the device at the time the home screen is displayed to the user). This arrangement is beneficial, for example if the user has a large number of notes, but does not recall where they edited notes, since this arrangement enables the user to retrieve notes most pertinent to the user's current location. At the time the note browser 286 groups and displays the notes in the notes list view 504 it can query the location module 240 of the client device 120 by passing in the location name of each of the groups to obtain the distance of the location from the current location of the device 120, and then order the groups based on the received distances.

In one embodiment, the location (either at creation time, editing time by the user, or display time) to be associated with a note 502 is mapped to nearest major location marker (e.g., city name, street address, business name), rather than simply using the exact latitude/longitude coordinates. Location module 240 itself or external services are available to return a location marker given a GPS, or other geocode input. This mapping of actual location (based on GPS or geocode) to nearest major location marker is beneficial since it associates notes with geographically significant places that are recognizable to the user, and thus beneficially aggregates notes to meaningful groups. Referring again to FIG. 6C all notes made within the city of San Francisco are shown as grouped in location group "San Francisco."

Figure 7:
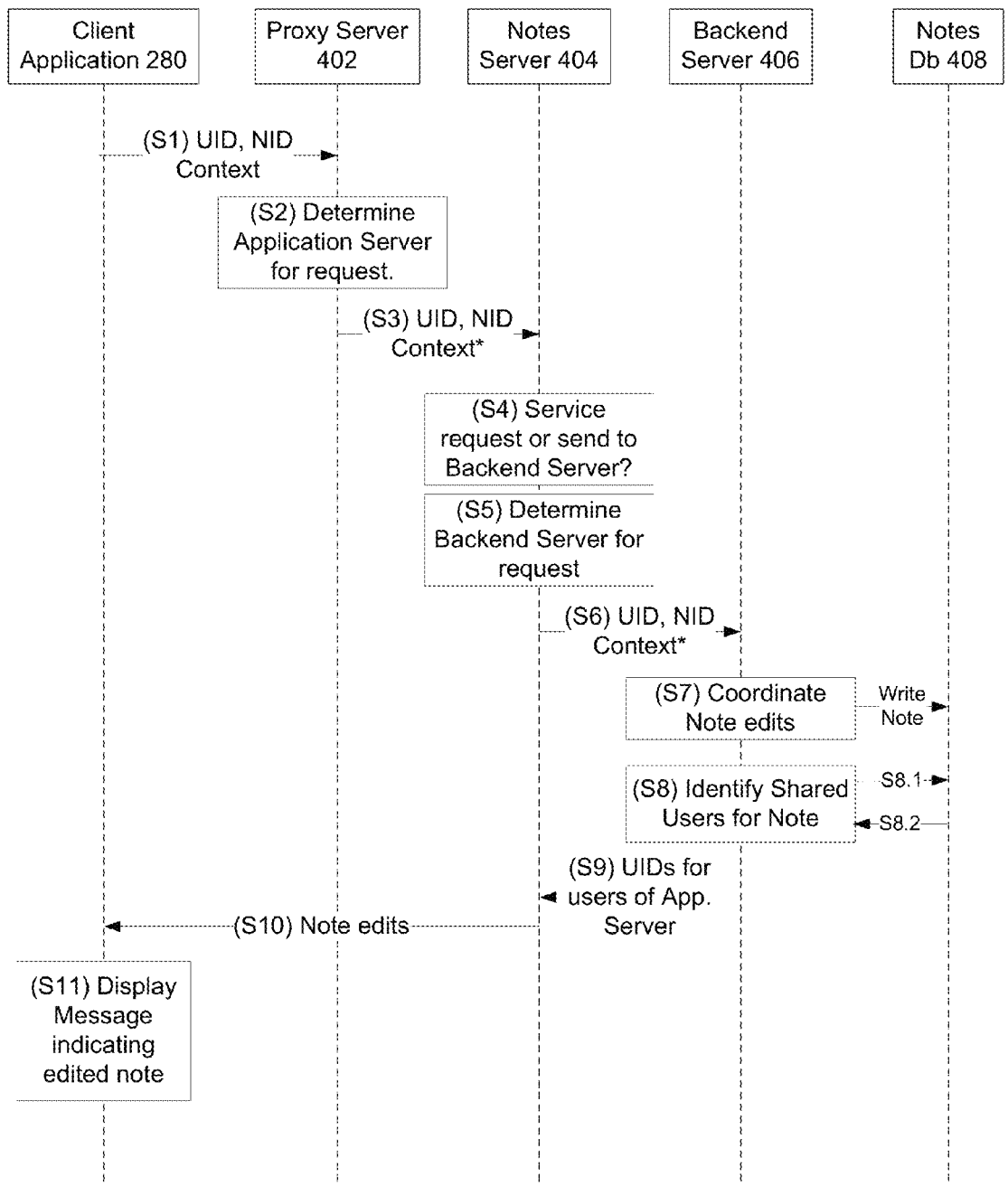
FIG. 7 is an interaction diagram for note processing by the note sharing system.

Referring to FIG. 7, there is shown an interaction diagram of how note processing is generally handled, in one embodiment. Client application 280 sends (S1) a request relating to a note to proxy server 402. Generally, a request indicates the userID ("UID") of the user, and the noteID ("NID") of the note, and additional contextual information as appropriate, such as the text of the note. Each client device 120 is associated with one of the notes servers 404, which is responsible for executing the client request. In one embodiment, users are associated with notes servers 404 using a modulo N function on the userID, where N is the number of notes servers 404 in use. The association of a user or client device 120 with a particular notes server 402 may be performed using a load balancing, fair scheduling, or other algorithm. When proxy server 402 receives the request, the proxy server 402 determines (S2) the particular notes server 404 associated with the requesting user or client device 120, and forwards (S3) the message to the identified notes server 404, amending the context of the request as appropriate. Proxy server 402 also returns a reference to the identified notes server 404 to client application 280, so the client application can directly communicate with the identified notes server 404 for future requests. In an alternative embodiment, client application 280 initially communicates directly with the particular notes server 404 assigned to the userID, using the same assignment function as otherwise used by proxy server 402.

When a notes server 404 receives a request, the notes server determines (S4) whether the request is to be executed by that notes server 404 itself, or by a backend server 406. When the request adds, edits, or otherwise modifies a note or index, the request is executed by a backend server 406. Requests that do not modify notes are executed by the notes server 404. For example, a request from client device 120 to view a note or obtain a list of notes responsive to a search term does not modify notes and is processed by notes server 404. By separating the modification of notes from searching of notes, a backend server 406 is able to rapidly propagate changes to a note to the users subscribed to that note. When a request modifies a note, notes server 404 determines (S5) which backend server 406 is responsible for the note to be modified and sends (S6) the request to that backend server 406. In one embodiment, notes are assigned to a backend server 406 based on their noteID, for example using a modulo M function, where M is the number of backend servers 406 in use. The association of a note with a particular backend server 406 may be performed using a load balancing, fair scheduling, or other algorithm. A notes server 404 may also receive edits from a backend server 406 to distribute to a client device 120 associated with that notes server 404. These edits may be edits performed on a note by another user that are being propagated to users subscribed to the note.

Figure 8:
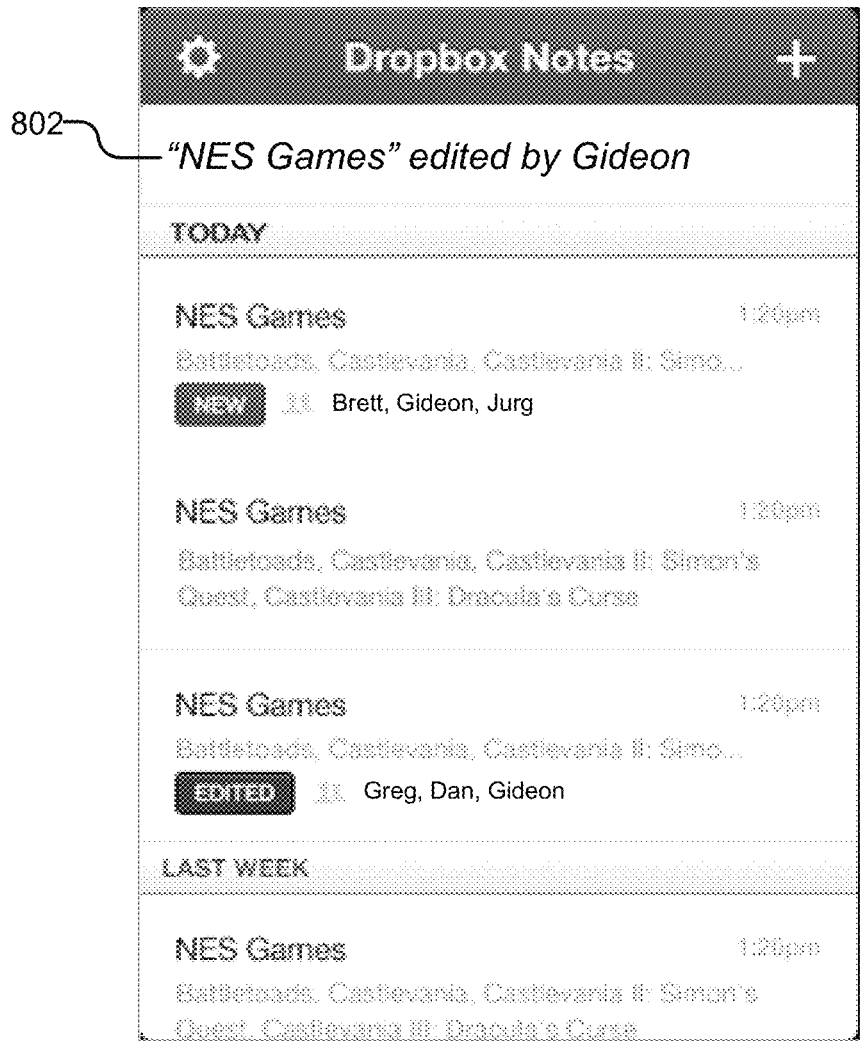
FIG. 8 is an illustration of the home screen, showing a message indicating a recently edited note.

The assigned backend server 406 coordinates (S7) and distributes note edits to subscribed users of a note. Coordination includes sequencing the edits (if multiple different edit requests for a given note are received contemporaneously) according to order of receipt, and writing the edits to notes database 408. Distribution includes propagating edits to the other sharing users for the note. Specifically, when the backend server 406 receives a request to edit a note, the backend server identifies (S8) the users subscribed to the note, for example by querying (S8.1) the note index using the noteID; the note index returns (S8.2) a list of userIDs of the sharing user. The backend server 406 propagates (S9) the edit to the notes servers 404 associated with each of the users subscribed to the note, by providing a list of userIDs for the users associated with each notes server 404. Each such notes server 404 then notifies each of the users to which it is associated and for whom there is an edited note, that the note has been edited, by sending a message (S10) to the client applications 280 on each such user's client device 120, the message indicating the note that has been edited (e.g., by title) and the user who made edits (e.g., user name). Client application 280 can then display (S11) a message based on this information. FIG. 8 illustrates a message 802 as it may appear on client application 280.

Figure 9:
FIG. 9 is an illustration of a menu for creating a new note in the home screen.
Figure 10:
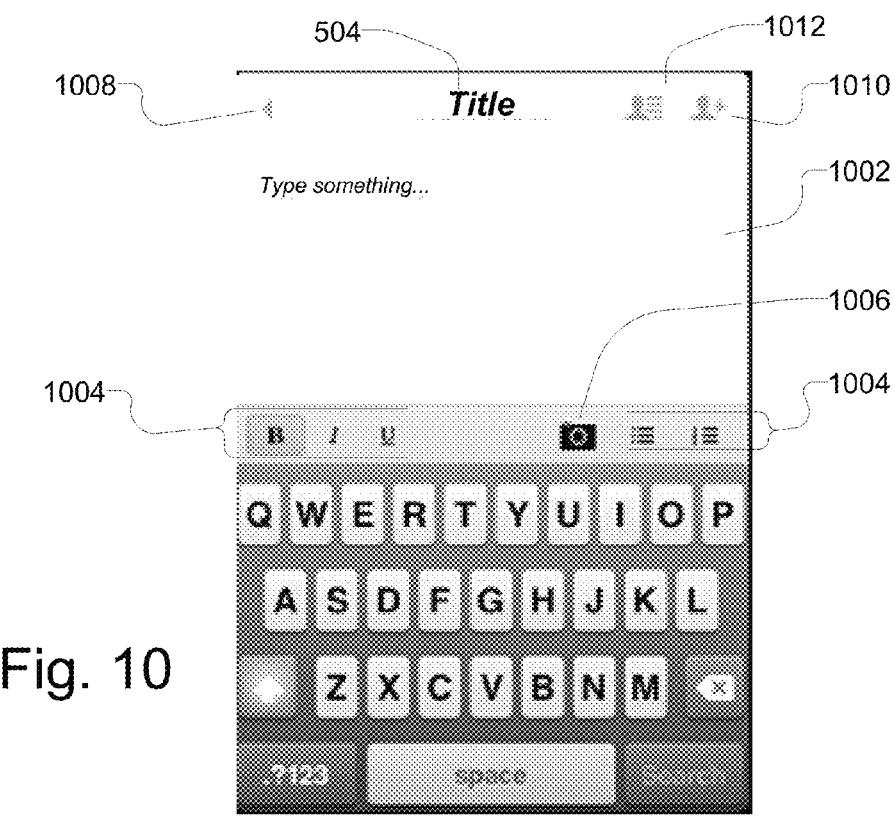
FIG. 10 is an illustration of new note in a note editor.

Referring to FIG. 9, there is shown the user interface of client application 280 configured for creating a new note using the note editor 282. In note editor 282, new note icon 902 enables a user to create a note. When the user clicks new note icon 902, submenu 904 appears. The user can select "Write" button 906, which creates a new note for text entry, or "Photo" button 908 to activate client device's camera 230 to create a new note including a photo. FIG. 10 shows a new note 1002 for text entry. The user can enter text directly, and apply formatting to the note, using formatting icons 1004 for bold, underline and italic fonts and paragraph formats (e.g., list format). The user can replace the text "Title" 504 with the desired title.

When the user creates a note by selecting New note icon 902, client application 280 instantiates a note, with a new noteID, and sends the noteID to proxy server 402, following generally the process shown in FIG. 7. The note is sent as its text and set of edits. Proxy server 402 routes the note to the notes server 404, which in turn routes the note to notes database 408 via backend server 406. On a periodic basis (e.g., every 5 milliseconds, or any other time set by the system administrator), client application 280 transmits a last set of changes to notes server 404. These are transmitted as edits, in the format discussed above. Notes server 404 calls the backend server 406 to store the edits with note 502 to the notes database 408.

Figure 11:
FIG. 11 is an illustration of an image provided by a camera of the client device for capturing a photo for inclusion in a new note.
Figure 12:
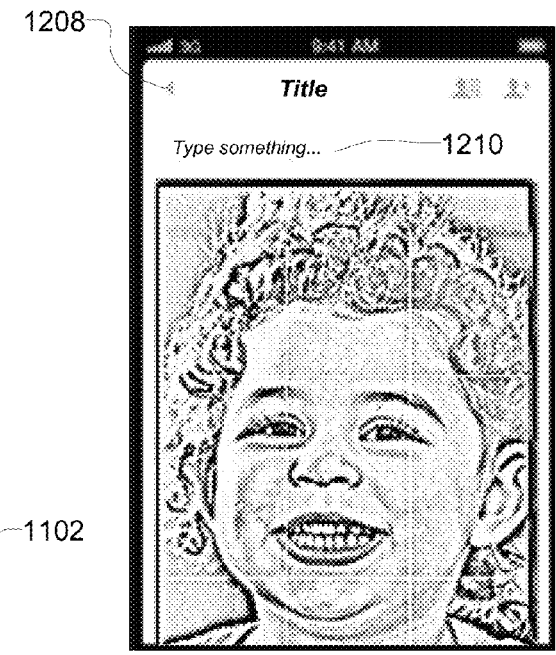
FIG. 12 is an illustration of a new note containing a captured photo.

In note editor 282, a user can create a new note based on a photograph, by selecting photo icon 1006. The current user can insert a photo into note 502 by selecting the photo icon, or by selecting the photo button 908 as shown in FIG. 9. The user is given the option to select an existing photo from storage on client device 120 or on note sharing system 130 to insert, or take a new photo with camera 230 of client device 120. Upon selecting a new photo for a note, or inserting a photo into an existing note, a camera view is shown in the client, such as shown in FIG. 11. The user takes the photo by selecting camera button 1102. The photo is inserted into a new note as shown in FIG. 12. The user can then enter text where the indication "Type something" 1210 is displayed. The selected or captured Photo (represented by a storage path, object identifier, URL, or the like) is included in the text of the note. Client application 280 transmits the new note to the notes server 404 as described above.

Note editor 282 is configured to close a note in response to the selection of the back icon 1008 (FIG. 10), 1208 (FIG. 12). In response to the selection, note editor 282 sends a message to the notes server 404 that the note is closed. Notes server 404 notifies note database 408 that the note is closed, which serves to initiate a storage operation to save the note. Note database 408 updates the note index to associate the new note with the current user, and any sharing user. Notes database 408 also updates the term index, by identifying each term in the note (excluding stop words), and updating the each such term in the term index to include the noteID of the current note. This enables the new note to be identified by searches on any terms included in the note.

Note editor 282 is configured to enable a user to share a note with other users; a user can share a newly created note, or an existing note. Referring again to FIG. 10, note editor 282 displays a sharing icon 1010. In response to the selection of this icon, client application 280 accesses contact directory 290 on client device 120, and displays the directory. The user can select one or more contacts to make as sharing users. Client application 280 sends information identifying the selected contacts (e.g., user email, userID if available) to note sharing system 130, along with the noteID of the current note. Note sharing system 130 is responsible for determining whether or not the selected contacts are already account holders, by querying the user account database 316 of content management system 100. If not, note sharing system 130 will send an invite to such users via their provided email address. For each selected contact who is a user of the system, note sharing system 130 updates the note index for the current note (using the noteID) to include the userID of the selected contact, thereby establishing that the current note is shared with the identified User.

Figure 13:
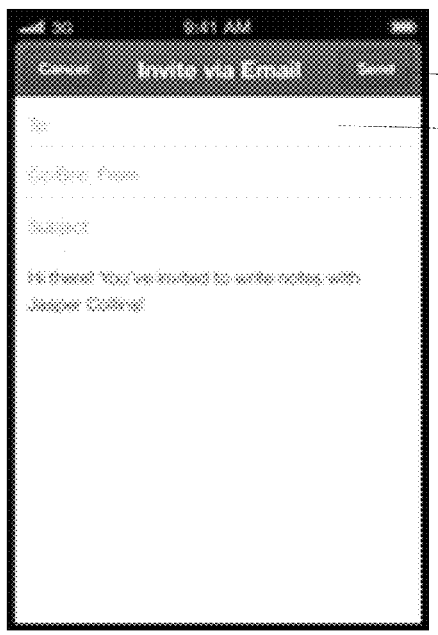
FIG. 13 is an illustration of an email for sending an invitation to a user to share a note.

Referring again to FIG. 10, client application 280 is configured to enable a user to directly invite others to share notes by selecting Invite icon 1012. Client application 280 displays an interface, as shown in FIG. 13, for receiving the email address(es) 1304 of the intended sharing user(s), along with a message and subject line. The user can then send 1302 the invitation, making use of the client device's installed email client. As noted above, in one embodiment, each sharing user has the same access, read, write and delete privileges; in other words, there is no "owner" of a note. In this embodiment, if a sharing user deletes a note, it becomes inactive for the other sharing users as well. Alternatively, note sharing system 130 can be configured so that when a user deletes a note, it becomes inactive only for that user, and remains active for the remaining sharing users.

Figure 14:
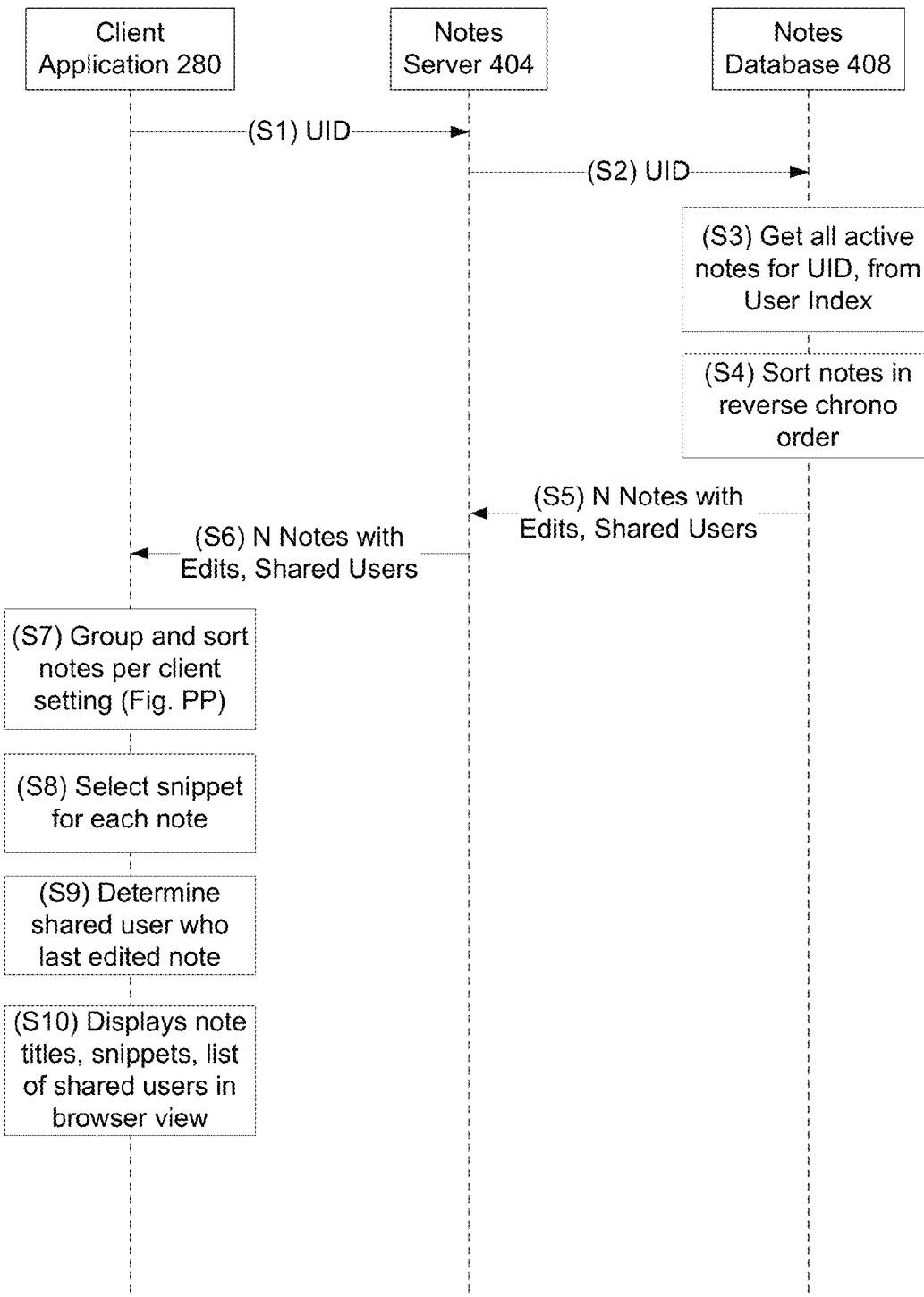
FIG. 14 is an interaction diagram of the process for generating the note list view in the home screen.

Referring now to FIG. 14, there is shown an interaction diagram for the implementation of the note list view of home screen 502 as shown in FIG. 5. Generally, the note list view is obtained using a search function of note sharing system 130, but passing only the userID of the current user, without any search terms. The results are than grouped and sorted according to applicable setting (e.g., as in FIG. 6). When the user enters the note list view initially, client application 280 transmits (S1) a search query containing only the userID of the current user to the assigned notes server 404 (either directly or through the proxy server 402, as described above).

Notes server 404 calls (S2) the search function of notes database 408, passing in the userID. As described above, the search function obtains (S3) all notes associated with the current userID for which the user status is active. The search function than sorts (S4) notes according to the edit/creation times in reverse order, and returns (S5) to notes server 404 a selected number N most recent note (e.g., N=20, or other user specified number). Presorting in this manner is beneficial if there are a large number of notes, since the application server 404 need only return a limited number of notes to client application 280 for display. Alternatively, the notes server 404 simply returns all notes, without sorting them beforehand. In either case, each note is returned with its associated edits, and list of sharing users. Notes server 404 passes (S6) the returned results to the client application.

Client application 280 receives notes, and groups and sorts (S7) them according to the grouping/sorting setting set in the client application 280 as illustrated in FIG. 6. For each note, client application 280 further determines from the edit list the timestamp of the most recent edit that is an insert, and selects (S8) some or all of that text as the snippet 506. Client application 280 also determines (S9) from the edit list the sharing user who made the last edit (or if the note is newly created, the user who created it). Client application 280 then displays (S10) note title 504, snippet 506, list of sharing users 508, edit time 510, and sharing user icon 514 of each note in the note list view. Client application 280 further displays Edited status icon 512 for each note that has been edited, and New status icon 512 for each new note.

In one embodiment, the user may configure the client application 280 to show in home screen 502 all notes associated with the user, only those notes that the user created, only those notes that the user has created and shared with others, or only those notes that are shared with the user, or any combination there. The selected sets are applied as filters by client application 280 when processing the received notes from notes server 404 in response to a query.

Figure 15:
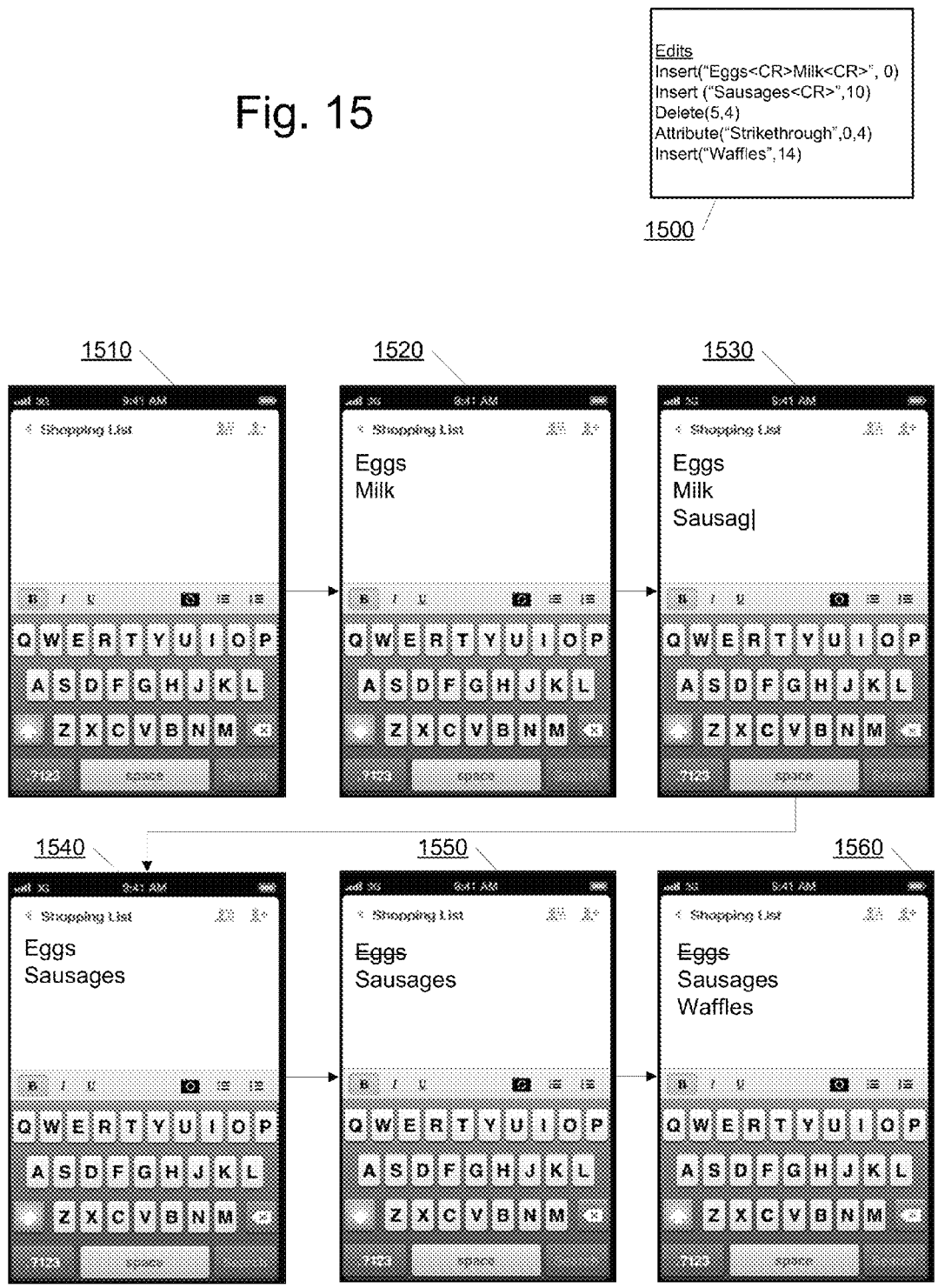
FIG. 15 shows a display animating edits to a note.

Note editor 282 is configured to animate the display of edits to a note. FIG. 15 illustrates an example of note editor 282 animating edits to a note. Since a note may be shared by many users, when the current user reads a note, edits made to a note by some other shared user may be not be noticed by the current user. To display edits to the current user, the note editor 282 displays a selected set of edits in an animated sequence to the current user to provide the appearance of the edits as if they were being made in real time in the current user's client application 280. The sequential display of edits in this fashion is called "replaying" the edits. The replayed edits are directly rendered to the screen of the client device, creating the appearance that the replayed edits are being entered contemporaneous with the user viewing the note. This beneficially avoids having to generate and encode video files from the edits. In one embodiment, the replayed edits are written directly to a screen buffer for the display.

FIG. 15 shows a display animating a note to a user. Note edits 1500 are displayed by client application 280 on display 210 of the client device as shown in panels 1510-1560. Each panel 1510-1560 indicates the progression of animating edits 1500 to the current user. Edits 1500 represent edits to a note made by user including information in the edit notion as described above. The note edits shown indicate the actual order of edits performed by the editing user or users. In this example, the editing user first inserted "Eggs", "Milk", and "Sausages" into the note, then deleted "Milk", changed the formatting of "Eggs" to strikethrough, and finally inserted "Waffles." The data representing edits 1500 indicate the order of edits either by maintaining the edits as an ordered list or using timestamps from which the ordered list may be derived.

Referring to FIG. 15, the note is presented in panel 1510 in the state as it existed prior to edits 1500 being made; this state is determined by client application 280 based on the edits associated with the note. The note displayed in panel 1510 may be provided by note sharing system 130, or the note prior to edits may be determined by performing edits in reverse from the note text that is available to client application 280. The edits may be grouped prior to being replayed to the user. For example, edits 1500 relating to the initial two inserts may be grouped together and presented to the user as shown in panel 1520. In one embodiment, when replaying the edits, the actual character changes to the note are displayed on an individual character-by-character basis. For example, in panel 1530, each letter s-a-u-s-a-g-e is sequentially added to the note and may be shown with the cursor position where the letter is being added. Similarly, deletions of words can be shown as a sequence of individual character deletions. Alternatively, edits can be animated at a word-level granularity, such that words appear sequentially in the order that they were inserted or deleted. In panel 1530, several letters have been added to the display, but the whole insertion "Sausages<CR>" is not yet complete.

Panel 1540 illustrates the deletion of "Milk," which may also be performed letter-by-letter. Panel 1550 shows the application of font modification to "Eggs." Panel 1560 shows the insertion of "Waffles."

To replay the edits, client application 280 receives the note as stored by the server along with the associated edits. Client application 280 filters the associated edits based on a set of rules prior to replaying to determine which edits to show to the user. Client application 280 determines based on the rules whether to show all edits to the user, or to bound the number of edits to the user by a set amount of time or a maximum number of edits. The amount of time may be bounded, for example, to 15 or 30 seconds. When the total number of edits exceeds the number that can be displayed within the set time period, then the client selects only certain edits to be displayed and filters out the remaining edits.

In one embodiment, to select which edits to replay, the client application applies a selection ordering to determine which edits to show to the user. Specifically, the ordering in one embodiment selects edits in the following order: A) insertions less than X characters, B) deletions of less than X characters, C) attribute modifications. X is set to a number of characters that can be readily displayed, such as 10 to 15 characters at a time. Edits that are not selected for replaying are applied to the text prior to replaying the selected edits to establish the state of the note.

Sequential edits are grouped for replaying to the user based on the type of edit. For example, the text insertion edits are grouped together, the text deletion edits are grouped together, and the text modification edits are grouped together. When a sufficient number of edits or amount of edited text is grouped together, the display of the edits when the edit is replayed is changed. For example, when two or more sentences are added, insertions are replayed at a word-by-word granularity rather than replay individual characters. In another embodiment, all edits of the same type (e.g. insertion) are grouped together and applied, regardless of the actual sequential order of the edits.

Figure 16:
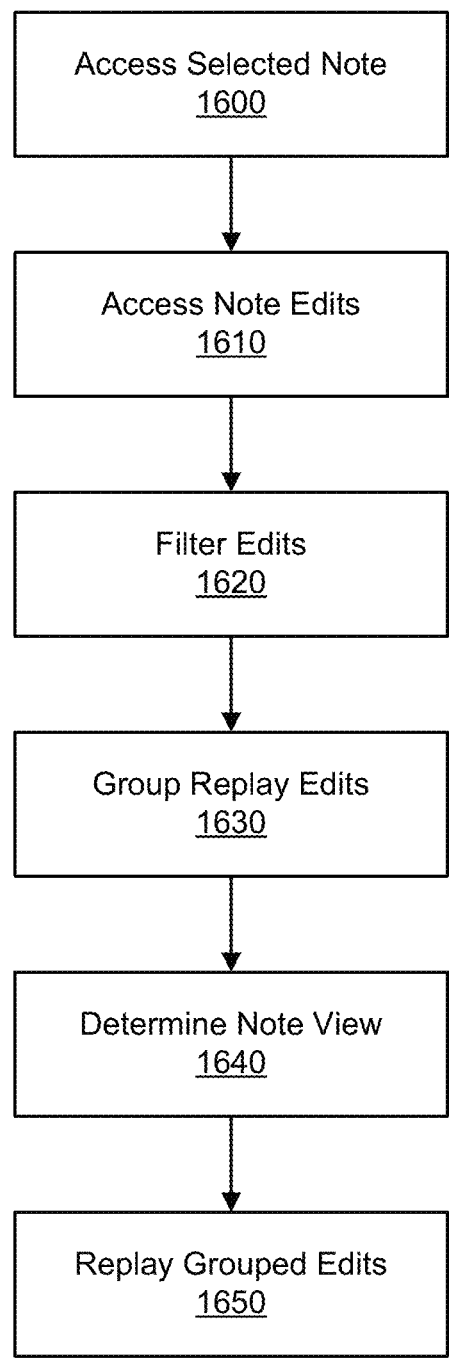
FIG. 16 shows a method for replaying edits to a note.

FIG. 16 illustrates a method for replaying edits to a note. After a current user selects a note to view, the notes client application 280 accesses 1600 the selected note and accesses 1610 the associated edits to the selected note. The selected note and edits may be locally stored on client device 120, or client application 280 may access the note and edits at notes sharing system 130.

As described above, the edits to the notes are filtered 1620 to determine which edits to replay to the user. The filtered edits are grouped 1630 to determine whether any edits should be presented to the user at a lower granularity (e.g., word-by-word) rather than a lower granularity (e.g., character-by-character). After determining which edits to present to the user and how, notes client application 280 determines 1640 the initial view to present to the user, as shown in panel 1510. Beginning with the determined note view, the grouped edits are replayed 1650 to the user on the display.

Figure 17:
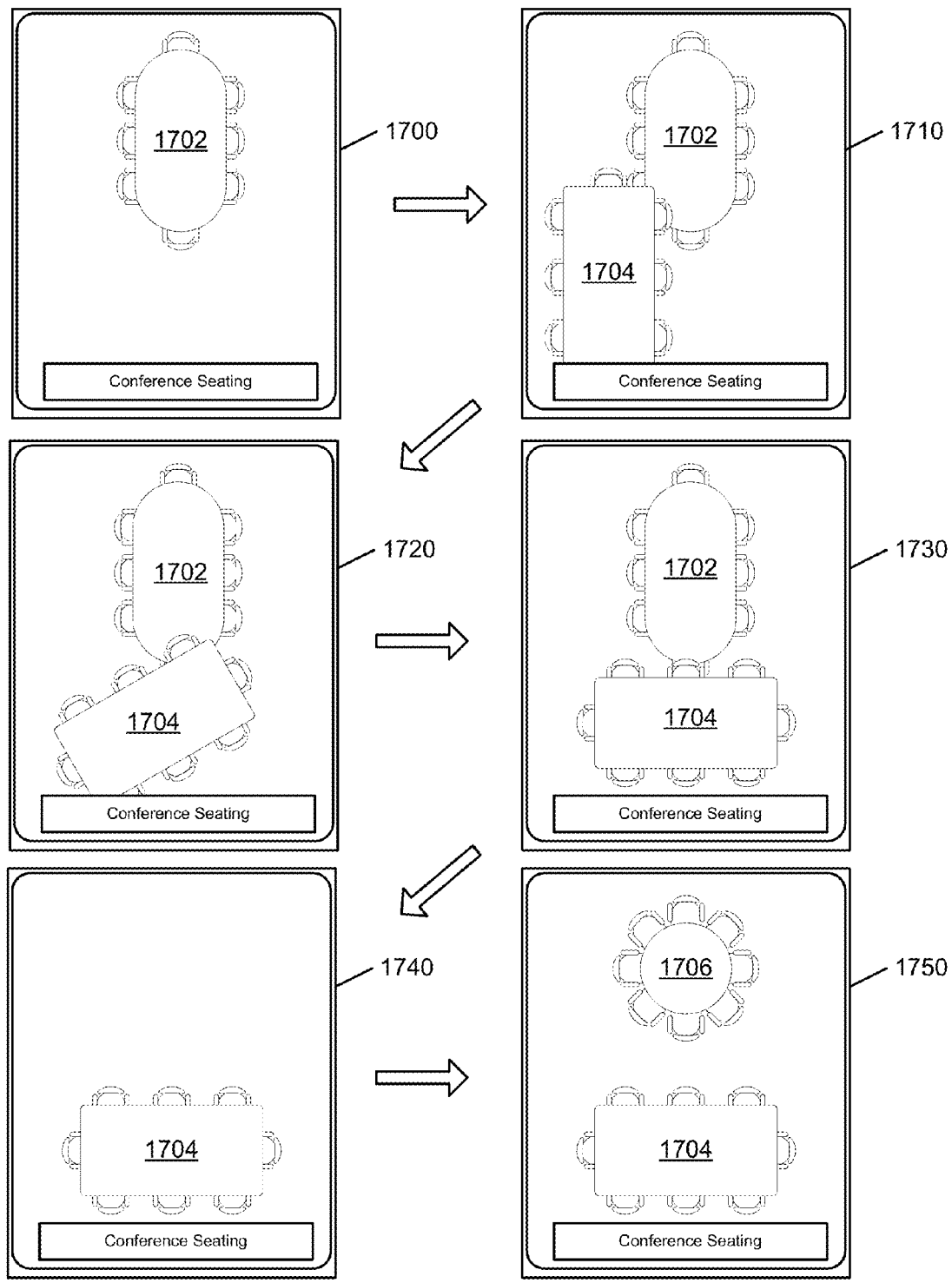
FIG. 17 shows a display animating edits to an image.

The techniques for replaying edits to the user may be performed using various types of documents and content items. FIG. 17 shows replaying edits to a graphical image in a series of panels 1700-1750. The initial state of the graphical image is shown in panel 1700, and the final state is shown in panel 1750. The editing user performed several edits as depicted in panels 1710-1750. These panels illustrate the view of the current user when viewing the edits performed by the editing user. In the first panel 1700, the image included a table 1702, which is how the current user last saw the image file. The editing user added a second table 1704 in panel 1710, and rotated the second table through panels 1720 and 1730. The first table 1702 was deleted in panel 1740, and an additional table 1706 added in panel 1750. In this way, the current user can view the transformation of the image during the editing process. As with the textual example with reference to FIG. 15, the client device accesses the image including a set of edits, and may re-organize or group the edits for presentation to the user. Additional types of content items, such as photos, collections (e.g. photos), presentations, and other visually-modified content items, are used in various embodiments to animate changes for a user. For example, in collection of images (e.g., a photo album), the animated edits may show the order in which images were added and remove from the collection, along with changes in the ordering of the images.

Animation of edits to a note may be presented to a user in several variations on the methods described above. For example, various steps of the method shown in FIG. 16 may be performed by notes sharing system 130 and delivered to client device 120 for presentation to the user. Such steps may include filtering edits, grouping edits, and determining the initial view of the note to be shown to the user. When displaying the edits to the user, a cursor may or may not be displayed in the animated replay of the edits.

When grouping edits, the grouped edits may be grouped to add entire sentences or paragraphs together. Such groupings may also be based on the portion of the note being changed. That is, all edits relating to a beginning portion of the note may be applied prior to displaying edits to a later portion of the note. The portion of the note being changed may be determined based on the display of the user device, such that the edits are applied without changing portions of the note displayed to the user. In another method, the grouping may sequentially group edits down the note. The position of the edit in the note is used to determine where to group edits down the note.

Edits may also be grouped by various hierarchies and categories. For example, one embodiment groups edits together based on individual users performing the edits, and next by the type of edit. In this example, user A's additions are grouped together for the initial replay of edits, user A's deletions are grouped together for the next replay of edits, while user B's additions are grouped and replayed after all of user A's edits.

One embodiment replays the edits in a strict chronological order. That is, this replay method displays edits as though the user were viewing edits as the edits occurred.

One embodiment modifies or removes edits to eliminate edits that are superseded, cancelled, or modified by other edits. For example, an edit to underline "hands off" is superseded in part by another edit that removes the underline for "hands." To determine superseded or canceled edits, the filtering step compares the position of the edits and determines whether the edits overlap. As another example embodiment, one edit that adds "hands off" and a second edit that adds "completely" between "hands" and "off" are combined to present "hands completely off" to the user as one edit.

SUMMARY

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

It should be noted that the process steps and instructions can be embodied in software, firmware or hardware, and when embodied in software, can be downloaded to reside on and be operated from different platforms used by a variety of operating systems.

The operations herein may also be performed by an apparatus. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method for displaying changes to a note, comprising:
receiving a request for a note;
accessing the note and a set of edits associated with the note, each edit in the set of edits modifying the content of the note;
automatically filtering the set of edits based on a set of rules to determine a set of replay edits and a set of excluded edits, the set of rules including at least one rule that prioritizes the edits in the set of edits, for inclusion in the set of replay edits, that include insertions less than a first number of characters prior to deletions less than a second number of characters, the set of excluded edits including the edits in the set of edits not included in the set of replay edits;
determining an initial view of the note based on the note and the set of replay edits;
providing the initial view of the note for display on a client device; and
applying each edit in the set of replay edits to the initial view of the note while displaying the note on the client device.

2. The method of claim 1, wherein each edit in the set of edits is associated with a timestamp and each edit is applied chronologically to the initial view of the note.

3. The method of claim 1, further comprising grouping edits in the set of replay edits prior to applying the edits to the initial view of the note.

4. The method of claim 3, wherein the replay edits are applied in an order based in part on the grouping of the replay edits.

5. The method of claim 3, wherein grouping the edits is further based on a user account identifier associated with the edits in the group of edits.

6. The method of claim 1, wherein applying each edit in the set of replay edits comprises displaying each edit character-by-character.

7. The method of claim 1, wherein applying each edit in the set of replay edits comprises displaying each edit word-by-word.

8. The method of claim 1, wherein the initial view of the note incorporates the edits filtered out of the set of edits.

9. The method of claim 1, wherein the filtering excludes an edit associated with a timestamp prior to a timestamp associated with a last access of the note by the user account.

10. The method of claim 1, wherein the filtering includes modifying edits in the set of replay edits that are superseded by other edits in the set of replay edits.

11. A system for displaying edits to a content item, comprising:
a processor configured to execute instructions;
a display; and
a memory storing instructions for execution on the processor, including instructions causing the processor to perform the steps of:
access a content item and a set of edits associated with the content item, each edit in the set of edits modifying the content of the content item;
select a first subset of the set of edits to replay to the user and a second subset of the edits that excludes edits included in the first subset, the selected subsets of edits being automatically selected based on a set of rules including at least one rule that prioritizes edits in the set of edits for inclusion in the first subset of the set of edits that include insertions less than a first number of characters prior to deletions less than a second number of characters;
present an initial view of the content item on the display, the initial view displaying the content item after applying the second subset of edits to the content item; and
apply the first subset of edits to the initial view of the content item, wherein applying the subset of edits modifies the content item by directly rendering an edit on the display.

12. The system of claim 11, wherein applying the first subset of edits comprises writing each edit to a screen buffer of the display.

13. The system of claim 11, wherein the instructions further cause the processor to filter the set of edits to determine the first subset and second subset of edits.

14. A non-transitory computer-readable medium comprising instructions executable by a processor to cause the processor to:
access a note and a set of edits associated with the note, the set of edits describing modifications of the content of the note, the edits associated with an order;
identify an edit in the set of edits that is modified by another edit in the set of edits, the another edit being after the identified edit in the order and of a different type of edit than the identified edit;
determine a modified edit comprising the identified edit as modified by the other edit;
determine a set of replay edits from the set of edits, the set of replay edits including the modified edit and excluding the identified edit, the set of replay edits further determined by applying a filter to the set of edits based on a set of rules that includes at least one rule that prioritizes the edits in the set of edits to include insertions less than a first number of characters prior to deletions less than a second number of characters;

determine an initial view of the note, the initial view based on the note prior to application of the set of replay edits;

display the initial view in a client application; and replay the set of replay edits in the client application in the order associated with the edits.

15. The non-transitory computer-readable medium of claim 14, wherein the instructions further cause the processor to determine the order associated with the edits.

16. The non-transitory computer-readable medium of claim 15, wherein the order is determined based on an edit type associated with each edit in the set of edits.

17. The non-transitory computer-readable medium of claim 15, wherein the order does not display the edits in a chronological order.

* * * * *